United States Patent
Makino

[19]

[11] Patent Number: 6,004,239

[45] Date of Patent: Dec. 21, 1999

[54] FRICTION TYPE CONTINUOUSLY VARIABLE SPEED CHANGING MECHANISM

[75] Inventor: Tomoaki Makino, Iwata, Japan

[73] Assignee: NTN Corporation, Osaka, Japan

[21] Appl. No.: 09/050,462

[22] Filed: Mar. 31, 1998

[30] Foreign Application Priority Data

| Mar. 31, 1997 | [JP] | Japan | 9-81200 |
| Mar. 31, 1997 | [JP] | Japan | 9-81201 |
| Mar. 31, 1997 | [JP] | Japan | 9-81202 |

[51] Int. Cl.⁶ ................................................. F16H 15/50
[52] U.S. Cl. .......................................... 475/194; 475/193
[58] Field of Search ....................................... 475/193, 194

[56] References Cited

U.S. PATENT DOCUMENTS

| 2,090,606 | 8/1937 | Barish | 475/193 |
| 3,108,496 | 10/1963 | Kashihara | 475/194 |
| 3,677,109 | 7/1972 | Stuemky | 479/194 X |

*Primary Examiner*—Allan D. Herrmann
*Attorney, Agent, or Firm*—Nikaido, Marmelstein, Murray & Oram LLP

[57] ABSTRACT

The invention provides a friction type continuously variable speed changing mechanism having a construction suitable for applications in which it is used to continuously change the speed of an output shaft for driving a high speed rotating body, such as the vane wheel of a centrifugal blower or the like.

This continuously variable speed changing mechanism comprises an input shaft 11 internally contacted by a plurality of cones 27 held for rotation and revolution, an output shaft 15 externally contacted by the plurality of cones 27, a pressing spring 19 for applying an elastic pressing force between the input and output shafts 11, 15 and the plurality of cones 27, and a speed changing ring 26 slidably pressed against the cones 27, the arrangement being such that the power is transmitted between the input and output shafts 11, 15 through the rotation and revolution of the cones 27 and the speed at which the power which is being transmitted is continuously changed by the sliding movement of the speed changing ring 26, said continuously variable speed changing mechanism further includes a cone holder 28 which comprises a cone supporting shafts 30, and a holder body 29 in which the cone supporting shafts 30 supporting the cones 27 are integrally disposed equally spaced circumferentially.

10 Claims, 13 Drawing Sheets

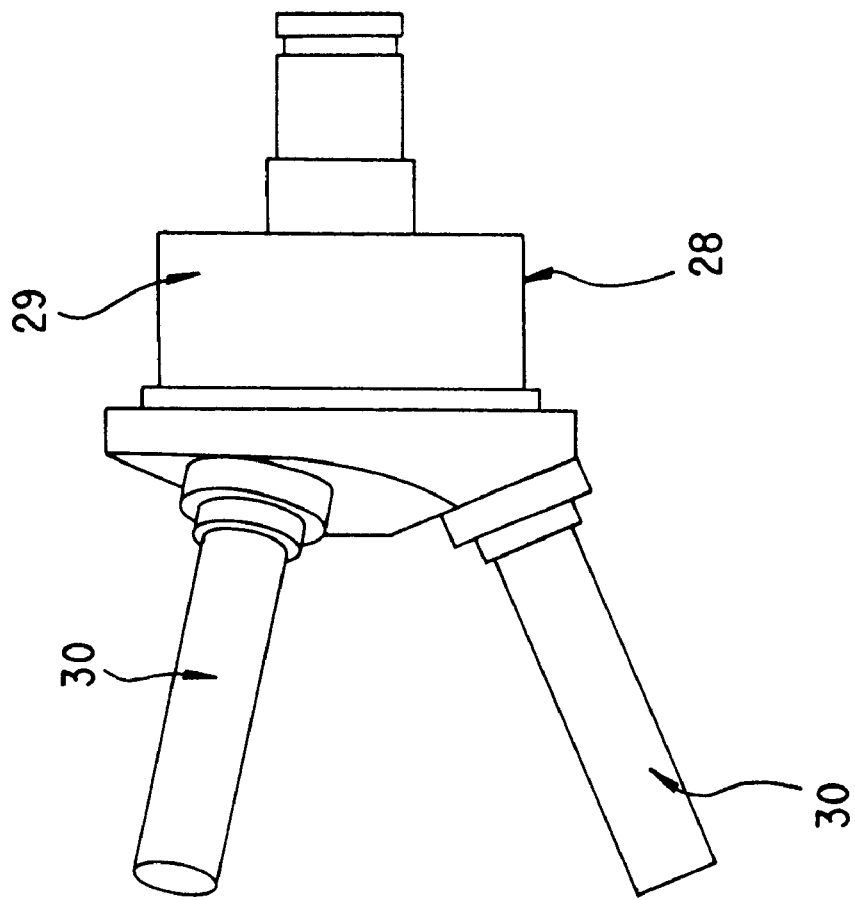
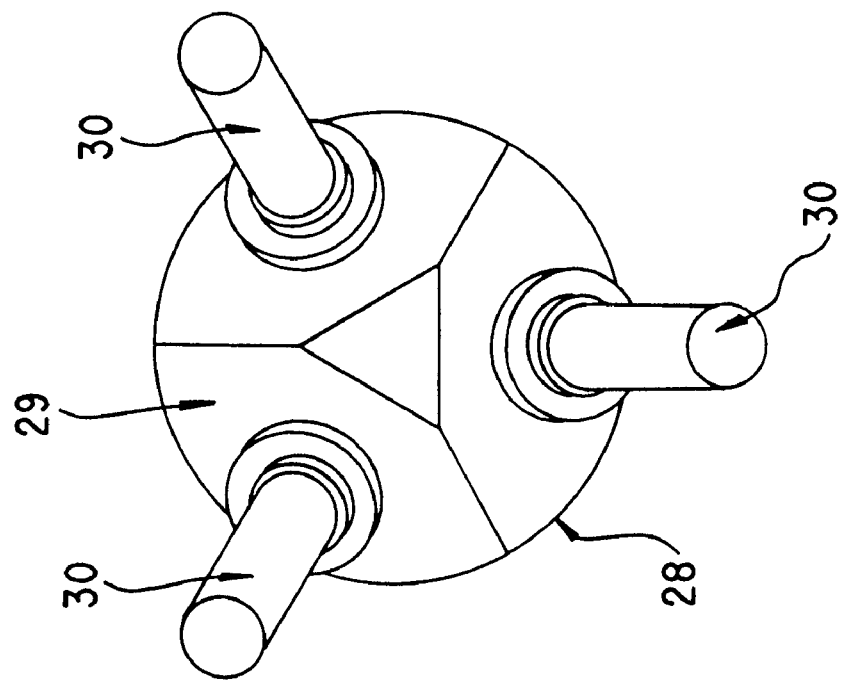

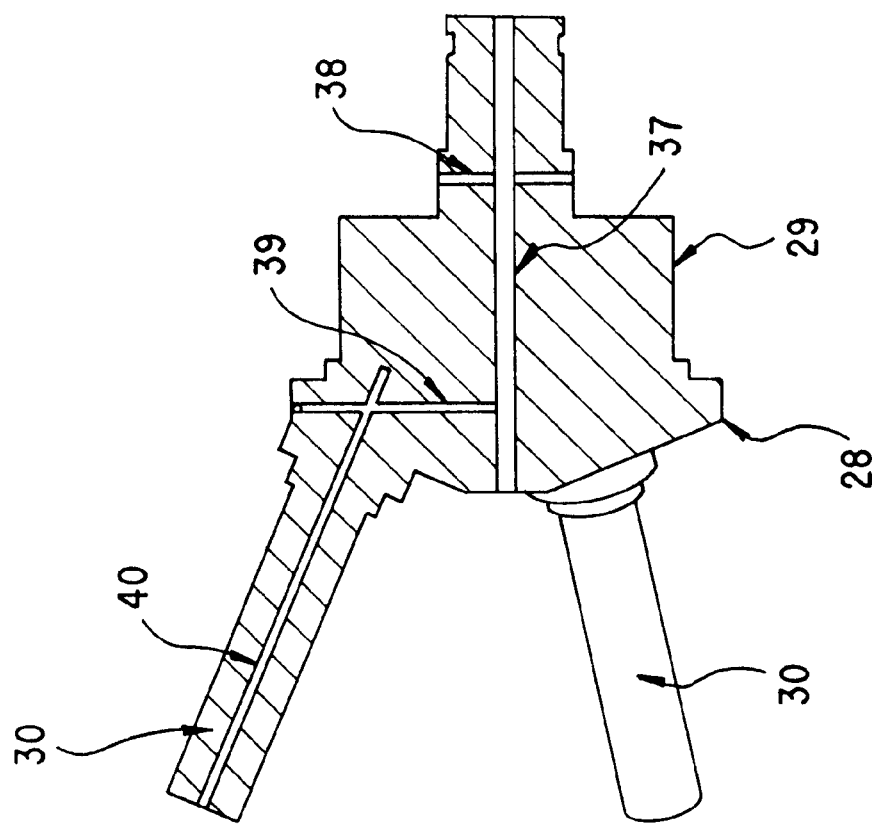
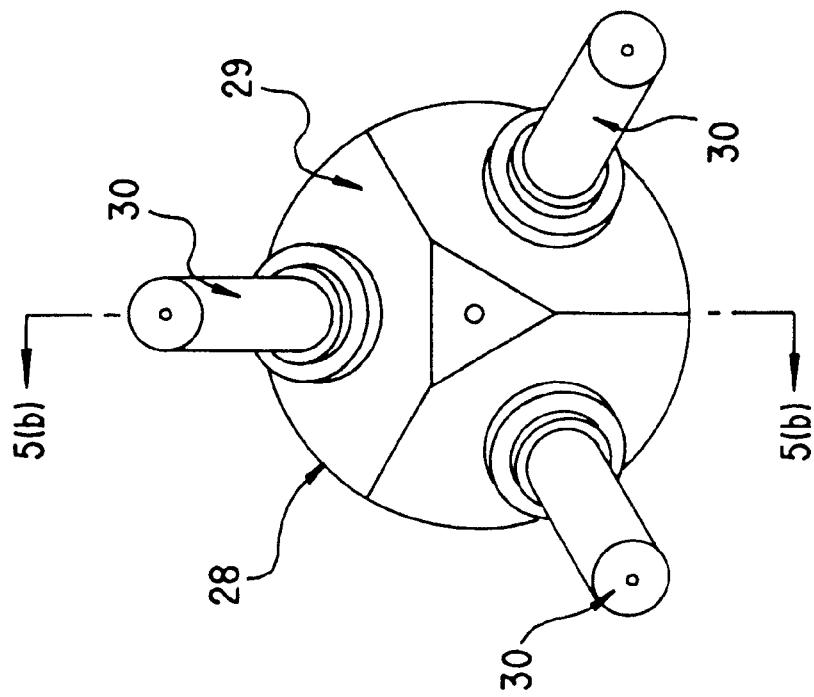

FRICTION TYPE CONTINUOUSLY VARIABLE SPEED CHANGING MECHANISM

BACKGROUND OF THE INVENTION

The present invention relates to a friction type continuously variable speed changing mechanism and particularly it relates to a friction type continuously variable speed changing mechanism used as a speed increaser in centrifugal blowers, centrifugal compressors, and the like.

As for a device which provides large speed ratios, the 3K planetary gear mechanism is generally known, and FIG. 16 shows a 3K friction type continuously variable speed changing mechanism which has said planetary gear mechanism applied thereto. FIG. 16 shows an application in which this continuously variable speed changing mechanism is used as a speed reducer; however, when it is used as a speed increaser, the input and output shafts 6 and 7 will change places with each other.

In this type of continuously variable speed changing mechanisms, planetary cones 1 are in contact with three traction members, i.e., an input disk 2, a cam disk 3 and a speed changing ring 4, one place for each traction member, totaling three places. The planetary cones 1 are constructed to be dynamically balanced by normal forces acting at said three contact places.

In this case, speed change is effected by moving the speed changing ring 4 in the directions of the input and output shafts. The reason why the balance of normal forces at the three contact places can be maintained irrespective of the axial movement of the speed changing ring 4 is that since the contact portions of the input disk 2 and the planetary cone 1 are formed by surfaces having quadric curvatures, the direction of the normal force acting on the contact portions of the input disk 2 and the planetary cone 1 changes with the axial movement of the speed changing ring 4. Thus, a cone holder 5 has the function of simply holding the planetary cones 1 circumferentially equispaced, not supported by the other members.

In this connection, the construction of the contact portions of the planetary cone 1 and the input disk 2 by using contact surfaces having quadric curvatures increases the influence of the spin. Further, in the case of using the continuously variable speed changing mechanism shown in FIG. 16 as a speed increaser, when the output shaft is rotated at high speed, this leads to the input disk 2 rotating at high speed, resulting in a large moment of inertia of the output shaft system and a large loss of power due to the large peripheral speed and spin in the contact portions, a fact which means that this type of continuously variable speed changing mechanism is not suitable for use with a centrifugal blower which rotates at high speed.

Further, the aforesaid contact portions have to be finished to have a fine surface roughness as by grinding or super-finishing in order to achieve the formation of a satisfactory oil film. Thus, in a case where the contact portions are formed by curved surfaces having quadric curvatures as in the case of the planetary cones 1 of the continuously variable speed changing mechanism shown in FIG. 16, it is difficult to finish them to have a fine surface roughness as by grinding or super-finishing, increasing the manufacturing cost.

Further, though not shown, there is another type of continuously variable speed changing mechanism in which both of the generatrices possessed by the conical surfaces in the contact portions of the input shaft traction portion and the cone and also in the contact portions of the output shaft traction portion and the cone are slightly inclined to the axis of the input and output shafts. It is such shape of the traction portions and an axial force loaded by a pressing spring that produce the normal forces necessary for transmission of power at the contact portions.

The normal force loading mechanism using said pressing spring has the merit of being simple in construction, but the pressing force is constant at all times irrespective of an increase or decrease in transmission power. Since the spring force is set on the basis of the greatest transmission power, it follows that in a case where the transmission power changes in a wide range, normal forces which are excessively large relative to the power will be produced during transmission of the lowest power. As a result, the decrease in transmission efficiency for lower transmission power becomes remarkable.

SUMMARY OF THE INVENTION

An object of the present invention is to provide a friction type continuously variable speed changing mechanism which is suitable for applications in which the output shaft for driving a high speed rotation body, such as the vane wheel of a centrifugal blower has its speed continuously changed, which continuously variable speed changing mechanism has a construction capable of preventing the transmission efficiency from lowering even when the transmission power is low, and of reducing the manufacturing cost.

As technical means for achieving said object, the present invention has the following characteristics.

① A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement (rotation and revolution) of said cones, said friction type continuously variable speed changing mechanism being characterized in that it includes a cone holder which comprises cone supporting shafts, and a holder body having said cone supporting shafts integrally disposed therein equally spaced circumferentially.

② A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement (rotation and revolution) of said cones, said friction type continuously variable speed changing mechanism being characterized in that it includes a cone holder which comprises cone supporting shafts, and a holder body having said cone supporting shafts inserted and fixed therein equally spaced circumferentially.

③ A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement (rotation and revolution) of said cones, said friction type continuously variable speed changing mechanism being characterized in that a portion for regulating the axial movement of each cone is disposed between said output shaft and each cone or between each cone and the cone holder.

④ A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement (rotation and revolution) of said cones, said friction type continuously variable speed changing mechanism being characterized in that a torque cam for changing the pressing force acting in the direction of the axis of the input shaft according to the input shaft torque is interposed between the traction portion internally contacted with said cone and said input shaft.

⑤ A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement (rotation and revolution) of said cones, said friction type continuously variable speed changing mechanism being characterized in that said cone is shaped to have not less than four conical surfaces and is pressed against said output shaft at at least those two of said conical surfaces which have the same generatrix.

⑥ Said cones are contacted with said input and output shafts and said speed changing ring at four conical surfaces of which two have the same generatrix, and all of the normal forces necessary for transmission of the power applied in the contact portions by said pressing means act always in a fixed direction, with a dynamically balaced state held with these normal forces alone taken to be the external forces.

⑦ A cone which constitutes part of a friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement (rotation and revolution) of said cones, said cone being characterized in that said cone is shaped to have not less than four conical surfaces, of which at least two have the same generatrix and are pressed against the output shaft.

According to the present invention, a continuously variable speed changing mechanism can be realized which is suitable for applications in which it is used to continuously change the speed of an output shaft for driving a high speed rotating body, such as the vane wheel of a centrifugal blower or the like, and which is highly practical; thus, the following effects can be attained.

① The provision of the cone holder which comprises cone supporting shafts, and a holder body having said cone supporting shafts integrally disposed therein equally spaced circumferentially, prevents the skewing of the cones to the axis of the input and output shafts, thus preventing a failure of rotation and the lowering of the transmission efficiency; therefore, a continuously variable speed changing mechanism which has high reliability and high performance can be realized.

② The provision of the cone holder which comprises cone supporting shafts, and a holder body having said cone supporting shafts inserted and fixed therein equally spaced circumferentially, ensures that as compared with the case in which the holder body and cone supporting shafts are formed in one piece, a waste material which has to be disposed of is not involved, the time and cost for manufacture can be saved.

③ The provision of the portion for regulating the axial movement of each cone which is disposed between said output shaft and each cone or between each cone and the cone holder, makes it possible to reliably hold all of the cones in the same axial position and to prevent the lowering of the efficiency or the lowering of the bearing life due to unbalanced loads acting on the input and output traction portions and on the bearings; therefore, a continuously variable speed changing mechanism which has high reliability and high performance can be realized.

④ The provision of the torque cam for changing the pressing force acting in the direction of the axis of the input shaft according to the input shaft torque which is interposed between the traction portion internally contacted with said cone and said input shaft, makes it possible to realize a continuously variable high-performance speed changing mechanism which has the desired transmission efficiency, without incurring a reduction in transmission efficiency even if the transmission power varies.

⑤ Each cone is shaped to have not less than four conical surfaces and is pressed against said output shaft at at least those two of said conical surfaces which have the same generatrix. The use of such cone ensures that all of the normal forces necessary for transmission of the power applied in the contact portions by said pressing means act always in a fixed direction, so that by suitably design of the corn shape it is possible to hold a dynamically balanced state with these normal forces alone taken to be the external forces; thus, the manufacturing cost can be reduced.

BRIEF DESCRIPTION OF THE DRAWINGS

FIG. 3(a) is a side view showing a cone holder for supporting a plurality of cones; and FIG. 3(b) is a front view of FIG. 3(a);

FIG. 5(a) is a side view showing a cone holder having oil passages formed therein; and FIG. 5(b) is a sectional view taken along the line 5(b)—5(b) in FIG. 5(a);

DESCRIPTION OF PREFERRED EMBODIMENTS

Embodiments of the invention will now be described in detail, In addition, the following embodiments are applied to the 3k friction type continuously variable speed changing mechanism having an output shaft which drives a high speed rotation body such as the vane wheel of a centrifugal blower.

Figure 1:
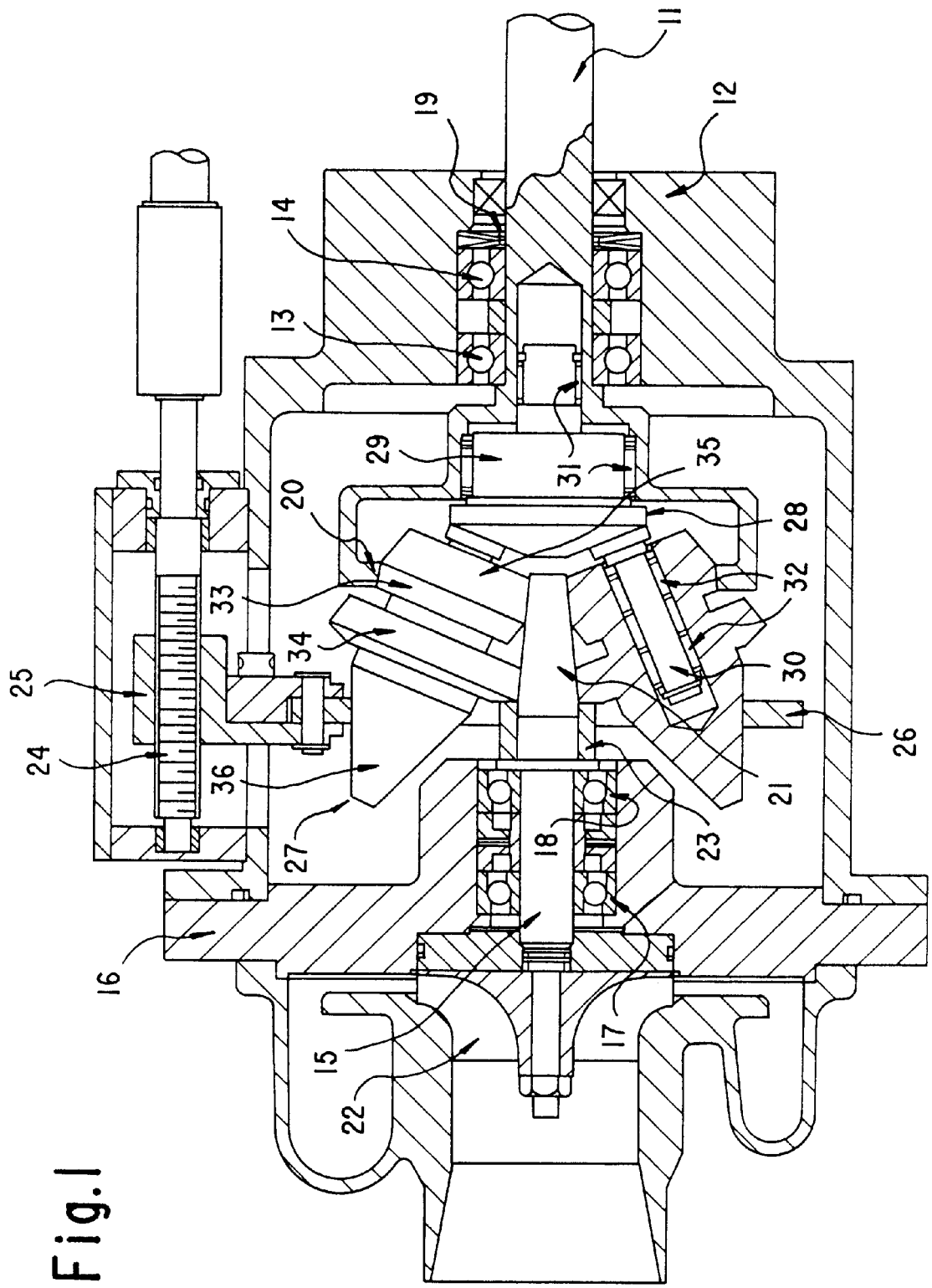
FIG. 1 is a sectional view showing the entire construction of a friction type continuously variable speed changing mechanism according to an embodiment of the present invention.

This friction type continuously variable speed-changing mechanism has an overall construction shown in FIG. 1. First, an input shaft 11 is rotatably supported by bearings 13 and 14 fitted in a housing body 12 and an output shaft 15 is rotatably supported by bearings 17 and 18 fitted in a front housing 16, said housing body 12 and front housing 16 being united together so that the input and output shafts 11 and 15 are axially aligned with each other. In addition, a pressing spring 19 which is a pressing means, is interposed between the bearing 14 and the housing body 12, said pressing spring 19 pressing the input shaft 11 through the bearings 13 and 14 to exert its elastic force toward the output shaft.

The inner shaft end of the input shaft 11 has an input shaft traction portion 20 having an integrally diametrically enlarged hollow shape and internally contacted at its front inner surface by the input-associated contact portion 33 of cones 27 (to be later described). Further, the inner end of the output shaft 15 has an output shaft traction portion 21 having an integrally diametrically reduced conical shape and externally contacted at its front outer surface by the output-associated contact portions 34 and 35 of the cones 27.

By making the contact between the input shaft traction portion 21 and the cones 27 at two contact portions 34 and 35, the pressure on the contact portions 34 and 35 can be reduced. In addition, a vane wheel 22 is fixed on the outer end of the output shaft 15. Further, the output shaft 15 has an annular member 23 fitted thereon for regulating the axial position of the cones 27.

On the other hand, for example, a ball screw 24 is installed in a housing body 12 in parallel with the input and output shafts 11 and 15 and a speed changing ring 26 is attached to a ball bushing 25 threadedly fitted on the ball screw 24, the inner surface of the speed changing ring 26 being pressed against the speed change-associated contact portions 36 of the cones 27, the rotation of the ball screw 24 enabling the speed changing ring 26 to be moved in the directions of the input and output shafts.

A plurality of cones are present among the input shaft traction portion 20, output shaft traction portion 21, and speed changing ring 26. In order to reduce the moment of inertia and peripheral speed of the output shaft 15 which rotates at high Speed, the rotational radius of the output shaft traction portion 21 is reduced, and by employing a construction in which the generatrix on the conical surface of the output shaft traction portion 21, the axis of the output shaft 15, and the axes of the cones 27 meet at one point, the occurrence of spin can be prevented, so that even when the cones 27 are brought into contact, at two contact portions 34 and 35, with the output shaft traction portion 21, loss of power caused by spin can be avoided.

Because of this construction, the angle formed between the rotation axes of the cones 27 and the input and output shafts 11 and 15 is considerably small. As a result, the cones 27 are axially elongated and so are the distance between the contact portions where normal forces and tangential forces (traction) act, producing a large moment which skews the cones 27. Unless a support construction which supports said moment is provided, drawbacks including a failure of rotation will occur.

Thus, these cones 27 are held at equal circumferential intervals by a cone holder 28 such that the cones can be rotated and revolved. As shown in FIG. 3, the cone holder 28 is in the form of an integral body having a holder body 29 and cone supporting shaft 30, said holder body 29 being coaxially rotatably inserted in the input shaft 11 through bearings 31. The cones 27 are rotatably supported through bearings 32 on a plurality of cone supporting shafts 30 integrally erected at equal circumferential intervals on the holder body 29. The use of such supporting construction for the cones 27 prevents the cones 27 from skewing to the input and output shafts 11 and 15, thus avoiding a failure of rotation and the lowering of transmission efficiency which are caused by skew.

Figure 2:
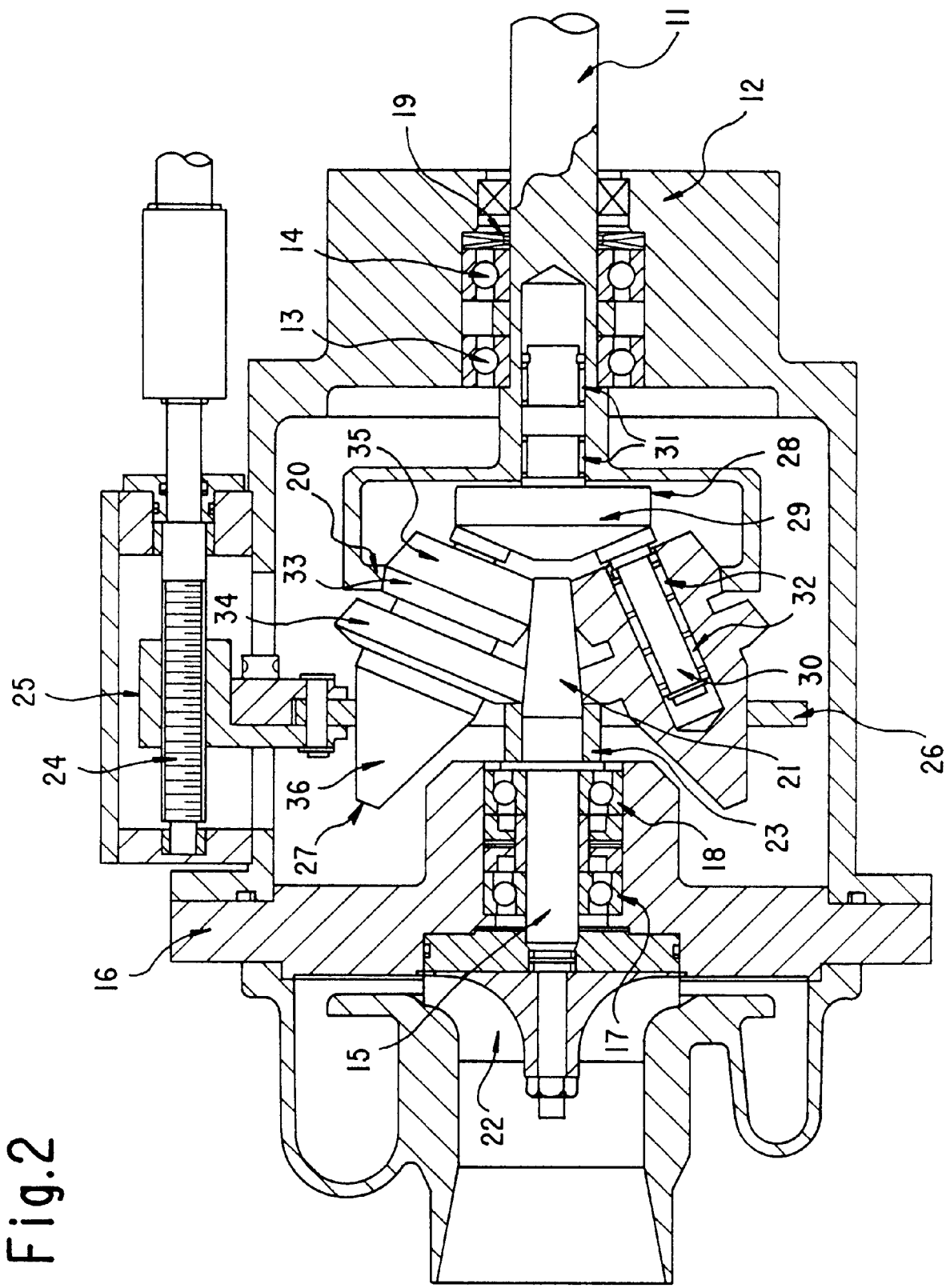
FIG. 2 is a sectional view showing another embodiment of the invention.

In addition, needle roller and cage assemblies, for example, can be used as the bearings 31 and 32 for said holder body 29 and cones 27, with the holder body 29 and cones 27 providing rolling surfaces for the bearings 31 and 32. Further, in the embodiment shown in FIG. 1, two needle roller and cage assemblies of different sizes are used as the bearings 31 for the holder body 29; however, as other construction than this one, two needle roller and cage assemblies of the same size may be used as the bearings 31 for the holder body 29 as in the embodiment shown in FIG. 2. Further, other rolling bearings than said needle roller and cage assemblies or sliding bearings can be used as the bearings for the holder body 29 and cones 27.

Each of said cones 27 makes friction contact with the input shaft traction portion 20 at one input-associated contact portion 33, the output shaft traction portion 21 at two output-associated contact portions 34 and 35, and the speed changing ring 26 at the speed change-associated contact 36 reduced in diameter toward the front end. The output-associated contact portions 34 and 35 of the cone 27 which are in contact with the output shaft traction portion 21 are conical surfaces having the same generatrix, and the generatrix of the output-associated contact portions 34 and 35, and also the generatrix of the input-associated contact portion 33 of the cone 27 which is in contact with the input shaft traction portion 20 are inclined by a slight angle with respect to the output and input shafts 15 and 11. The above mentioned wedge-shaped contact portions and the axial force applied by the pressing spring 19 are used to apply the normal forces necessary for power transmission at the contact portions 33–36 between the input and output shaft traction portions 20, 21, speed changing ring 26 and the cones 27.

In this friction type continuously variable speed changing mechanism, the power is transmitted from the input shaft 11 to the input-associated contact portions 33 of the cones 27 through the input shaft traction portion 20, the power being divided between the rotation and revolution of the cones 27 and transmitted from the output-associated contact portions 34 and 35 to the output shaft 15 through the output shaft traction portions 21. At this time, the ratio between the rotation and the revolution of the cones 27 is determined by the position at which the speed changing ring 26 contacts the speed change-associated contact portions 36 of the cones 27, said ratio determining the overall speed ratio. And the speed ratio can be continuously changed by moving the speed changing ring 26 in the directions of the axis of the input and output shafts. Thereby, the speed of the output shaft 15 which drives the vane wheel 22 at high speed can be continuously changed and even if the speed of the input shaft 11 varies, the output shaft 15 can be rotated at a constant speed.

Figure 4:
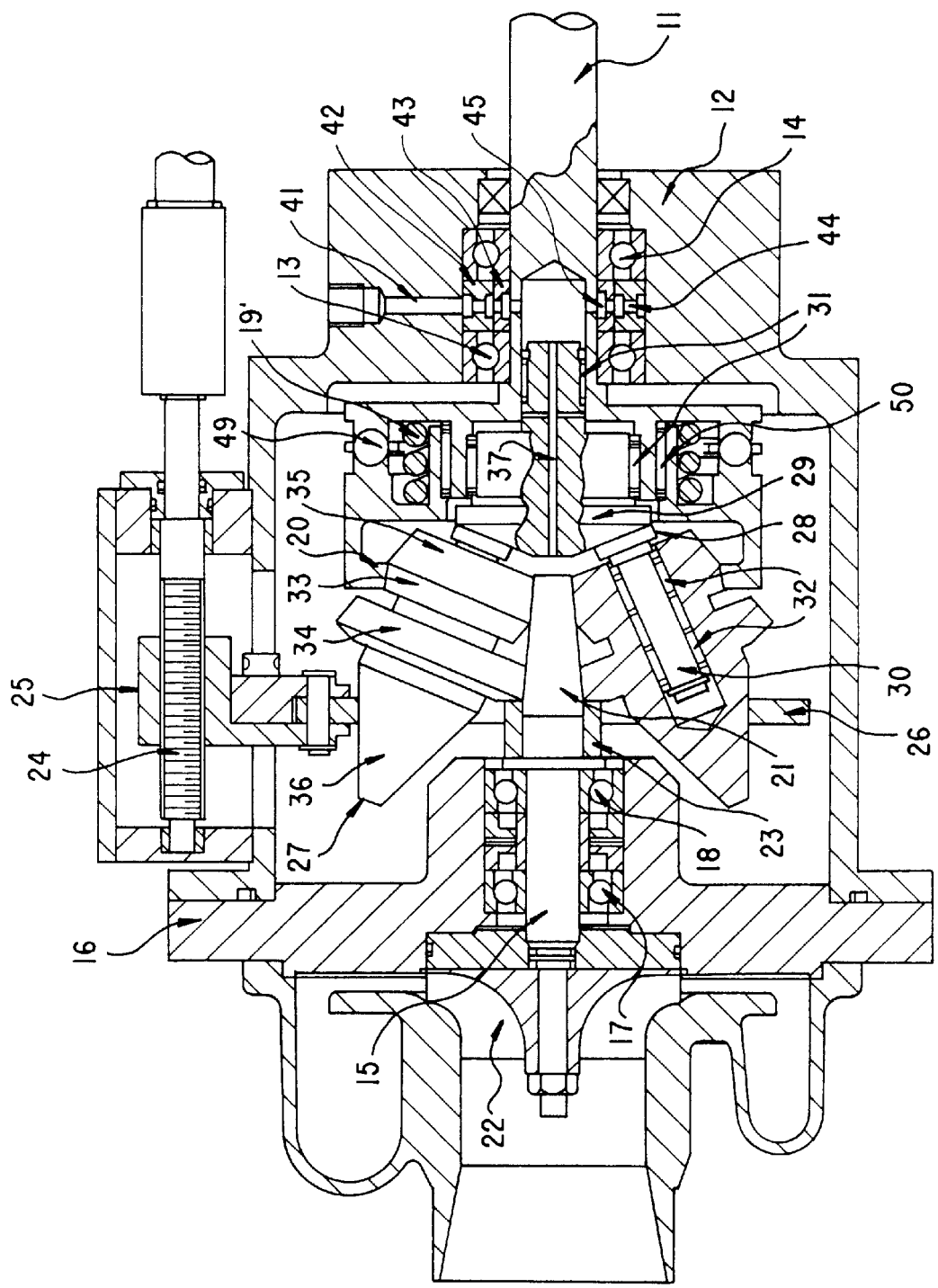
FIG. 4 is a sectional view showing an embodiment including a torque cam disposed between a traction portion and an input shaft, with oil passages formed in a cone holder.
Figure 6:
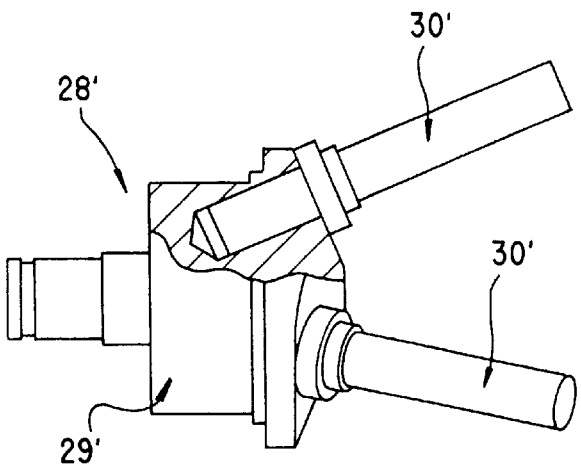
FIG. 6 is a front view, partly in section, showing a cone holder comprising a cone holder body and cone supporting shafts which are separate from said cone holder body.
Figure 7A:
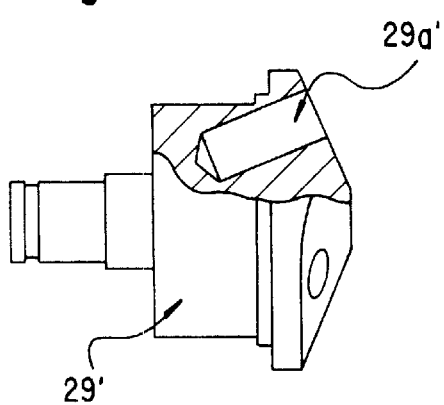
FIG. 7(a) is a front view, partly in section, showing the holder body of FIG. 6.
Figure 7B:
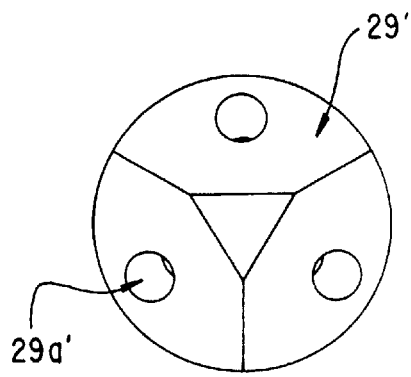
FIG. 7(b) is a side view of FIG. 7(a)
Figure 7C:
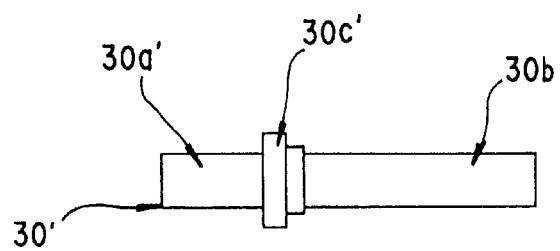
FIG. 7(c) is a front view showing the cone supporting shaft of FIG. 6.

Further, in an embodiment shown in FIG. 4, the input shaft traction portion 20 is disposed axially inwardly of the input shaft 11 through a torque cam 49, with the input-associated contact portions 33 of the cones 27 internally contacting the front inner surface thereof. In addition, the illustration shows the torque cam 49 using steel balls; however, it may be a torque cam of other type, such as the face cam type.

This input shaft traction portion 20 is supported by the input shaft 11 through a bearing 50. This bearing supporting construction prevents the degradation of the performance due to the radial displacement of the input shaft traction portion 20 and improves the axial alignment of the input shaft traction portion 20 with the input shaft 11, thus preventing large radial unbalanced loads from acting on the bearings 32 supporting the cones 27, the bearings 13 and 14 for the input shaft 11 and the bearings 17 and 18 for the output shaft 15.

In addition, a needle roller and cage assembly, for example, maybe used as the bearing 50 for the input shaft traction portion 20; a rolling bearing other than this one, a sliding bearing, a cylindrical member made of a low friction material (oil-impregnated bearing material, copper alloy, resin or the like) can be used. Further, the input shaft traction portion 20 may be directly supported as by being clearance-fitted on the input shaft 11.

Further, a pressing spring 19', which is a pressing means, is interposed inwardly of the torque cam 49 and between the input shaft 11 and the input shaft traction portion 20, said pressing spring 19' being used to press the input shaft traction potion 20 to exert its elastic force in the direction of the output shaft.

The use of the torque cam 49 interposed between the input shaft 11 and the input shaft traction portion 20 increases the pressing forces acting in the directions of the axis of the input and output shafts as the input shaft torque increases. That is, the torque cam 49 in this embodiment is constructed such that steel balls are received in recesses (conical or other shape) formed in the end surface of the input shaft 11 and the end surface of the input shaft traction portion 20, so that there is produced a pressing force which is the sum of the spring force provided by the pressing spring 19' and the force provided by the torque cam 49. The torque cam 49 prevents the transmission efficiency from being decreased as the transmission power changes. In addition, even in the case of low torque when the pressing force produced by the torque cam 49 is low, the rotation is stabilized by the elastic force of said pressing spring 19'.

Further, owing to the construction in which the torque cam 49, the pressing spring 19', the bearing 50 for the input shaft traction portion 20 and the bearings 31 for the cone holder 28 are substantially concentrically arranged, there is no possibility of the axial dimension of the overall variable speed changing mechanism being elongated, facilitating the reduction of size of the device.

As for the system for supplying lubricating oil to the various contact portions involved in power transmission, the bath lubrication system is the simplest lubricating system. However, in the case of a friction type continuously variable speed changing mechanism as in the present invention, the use of the bath lubrication system would result in the revolution of the cones 27 encountering a high churning resistance of oil, the higher the rotational speed, the more pronounced the power loss due to such churning resistance. Further, most of the lubricating oil is radially outwardly splashed owing to the centrifugal force produced by the rotation and revolution of the cones 27, and sufficient lubricating oil is not fed to the output shaft traction portion 21 where the highest peripheral speed appears; thus, this bath lubrication system is unsuitable. Besides the bath lubrication system, there is another system in which lubricating oil is blown radially from the outside, which system, however, is also unsuitable since it tends to cause lubricating oil shortage at the output shaft traction portion 21.

Thus, oil passages 37–40 are formed in the cone holder 28 as shown in FIGS. 4 and 5. First, lubricating oil is fed under pressure to the contact portions between the output shaft traction portion 21 and cones 27 through the oil passage 37 axially formed in the holder body 29. The lubricating oil thus fed is splashed all over radially outward by the centrifugal force produced by the rotation of the output shaft 15 and the rotation and revolution of the cones 27, so that the other contact portions (between the input shaft traction portion 20 and the cones 27 and between the speed changing ring 26 and the cones 27) are fed with sufficient lubricating oil.

By forcibly feeding lubricating oil to the bearings 32 through the oil passages 37 and 39 and through the oil passages 40 formed in the cone supporting shafts 30, damage to the bearings 32 due to lubricating oil shortage is prevented. Further, by feeding lubricating oil to the bearings 31 through the oil passage 37 and through the oil passages 38 and 39 radially formed in the holder body 29, seizure due to lubricating oil shortage is prevented.

In addition, the feeding of lubricating oil to the cone holder 28 is effected by providing an oil passage 41 in the housing body 12 and a first spacer 42 interposed between the outer races of the bearings 13 and 14 for the input shaft 11 and a second spacer 43 interposed between the inner races thereof as shown in FIG. 4. As the input shaft 11 rotates, the first spacer 42 is at rest and the second spacer 43 rotates with the input shaft 11. The inner diameter of the first spacer 42 is somewhat larger than the outer diameter of the second spacer 43 to the extent of not greatly degrading the sealing quality between the spacers, thereby reducing the sliding resistance between the spacers. The first and second spacers 42 and 43 are provided with holes 44 and 45 radially extending to allow the lubricating oil which has passed through the oil passage 41 in the housing body 12 to flow into the input shaft 11 through the holes 44 and 45 in the first and second spacers 42 and 43, so that it is fed to the cone holder 28.

In this connection, it is to be noted that the cones 27 described above are shaped such that the centrifugal force and gyroscopic moment applied to the cone during high speed rotation are dynamically balanced by the normal forces acting at the four contact portions. However, if the manufacturing accuracy concerning the positional relation of the cone supporting shafts 30 to the holder body 29 is poor, the dynamic balance of the cones 27 is not held, thus imposing excessive loads on the cone supporting shafts 30 and bearings 32. Further, the balance of forces imposed on the input shaft traction portion 20 or output shaft traction portion 21 by the plurality of cones 27 is upset, so that radially directed excessive unbalanced loads are imposed on the bearings 13 and 14 for the input shaft 11 or the bearings 17 and 18 for the output shaft 15. This results in short life of or premature damage to the bearings 13 and 14 for the input shaft 11 or the bearings 17 and 18 for the output shaft 15. Further, if the manufacturing accuracy of the cone holder 28 is poor and the cones 27 are skewed with respect to the input and output shafts 11 and 15, this greatly decreases the efficiency of power transmission, leading to a failure of rotation.

Accordingly, as in the embodiment described above, the cone holder 28 has been constructed integrally with the holder body 29 and cone supporting shafts 30 (see FIG. 3) and the positional relation of the cone supporting shafts 30 to the holder body 29 has been provided with satisfactory manufacturing accuracy However, in the case where the holder body 29 and the cone supporting shafts 30 are integrally formed, it is necessary that the large space between adjacent cone supporting shafts 30 has to be created by milling or lathing. Therefore, there is a large amount of waste material to be disposed of and the processing requires substantial time, possibly adding to the manufacturing cost.

Therefore, as shown in FIGS. 6 and 7(a) to 7(c), for example, the manufacturing cost can be reduced by manufacturing a cone holder 28' having a holder body 29' and cone supporting shafts 30' which are separate bodies. That is, in the case of the holder body 29' supporting three cones, it is manufactured by processing such that the planes which are normal to the cone supporting shafts 30' define triangular pyramidal surfaces, said holder body 29' having insert holes 29a' to receive the cone supporting shafts 30'. Further, each cone supporting shaft 30' is formed with a flange 30c' disposed between an insert portion 30a' to be inserted in the holder body 29' and a cone supporting portion 30b', said flange 30c' regulating the length of the cone supporting shaft 30' to be inserted in the holder body 29'.

Such cone holder 28' having the holder body 29' and cone supporting shafts 30' made as separate bodies is manufactured by assembling the components as by press-fitting or shrinkage-fitting the cone supporting shafts 20' in the holder body 29'. At this time, the lateral surfaces of the flanges 30c' formed on the cone supporting shafts 30' abut against the triangular pyramidal surfaces of the holder body 29', whereby the post-assembly strength of the cone supporting shafts 30' is improved. Further, the cone supporting shafts 30' will not be finished till the last process, and some cutting allowance for the cone supporting portion 30b' will be left. And after the assembling operation, the cone supporting portion 30b' is finished (ground), thereby providing the necessary accuracy.

Figure 8:
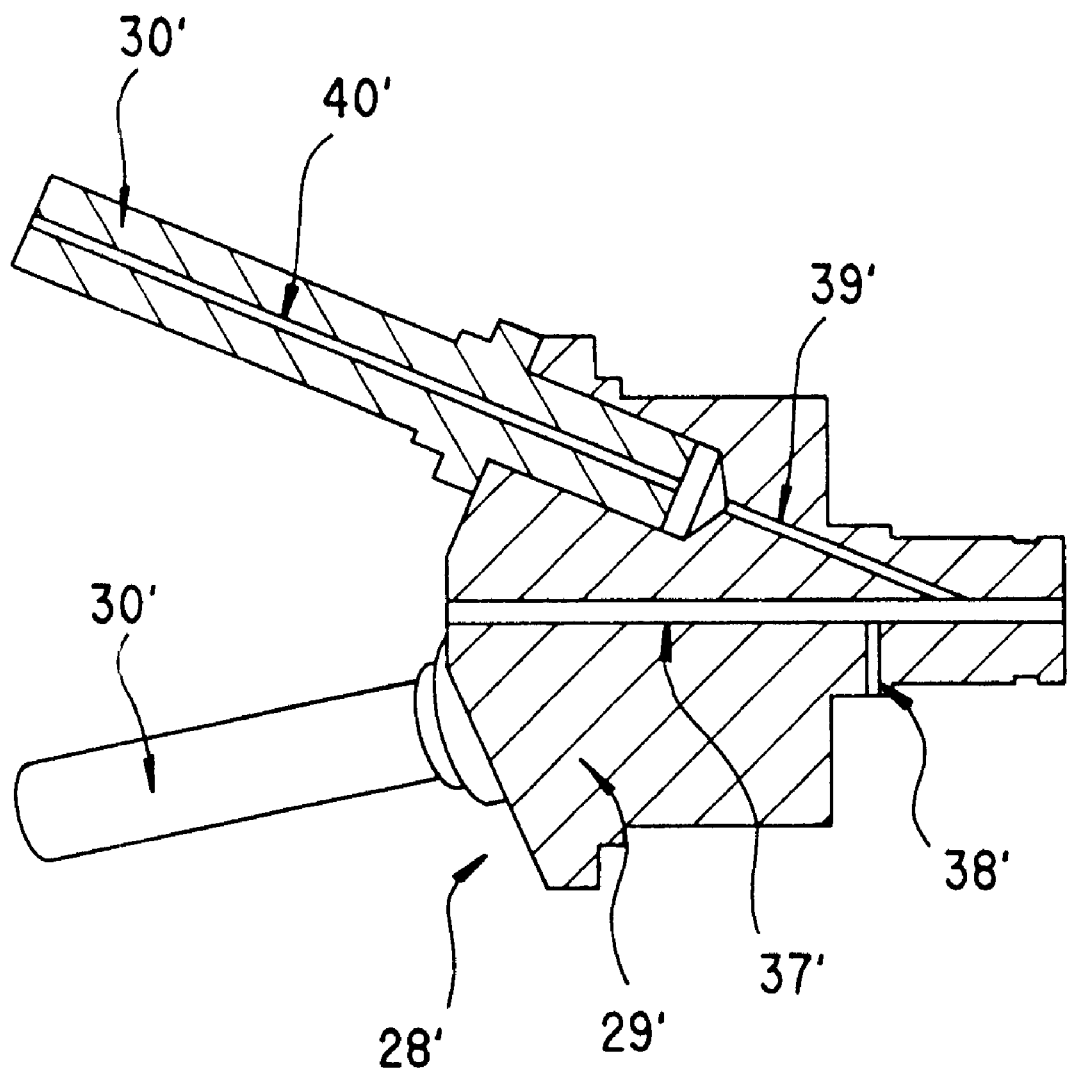
FIG. 8 is a sectional view showing the formation of oil passages in the cone holder of FIG. 6.

In addition, as shown in FIG. 8, as in the case of the cone holder 28 constructed such that the holder body 29 and cone supporting shafts 30 are integral with each other (see FIG. 5), if oil passages 37'–40' are formed in the holder body 29' and cone supporting shafts 30', the feeding of sufficient lubricating oil to the contact portions is improved and facilitated. Further, the feeding of sufficient lubricating oil to the cone holder 28' can be effected by employing the same construction as described in the embodiment described above including the oil passage 41 formed in the housing 12 as shown in FIG. 4 and the first and second spacers 42 and 43.

In this connection, if the axial alignment between the input and output shaft traction portions 20 and 21 is perfect, the plurality of circumferentially equispaced cones 27 will all be regulated also axially to the same position. However, in practice, there is a danger of an axial variation occurring between the cones 27 during operation according to the manufacturing accuracy and assembling accuracy of the various parts and the radial play in the bearings.

If this variation is large, there will be unbalanced loads imposed on the input and output shaft traction portions 21 and 22 and the bearings as the input and output shafts 11 and 15 are rotated, incurring a high possibility of causing irregular rotation and decreases in efficiency and bearing life. Therefore, regulation of axial position of the cones 27 becomes necessary. In addition, when this position regulating portion is provided, the cones 27 and the axial position regulating portion will comes in sliding contact with each other, sometimes making it necessary to minimize the power loss due to this contact.

Figure 9A:
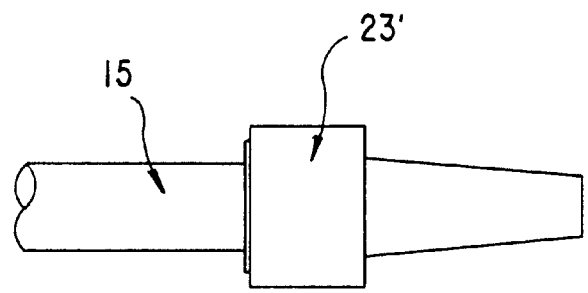
FIG. 9(a) is a partial front view showing an output shaft formed with a flange.
Figure 9B:
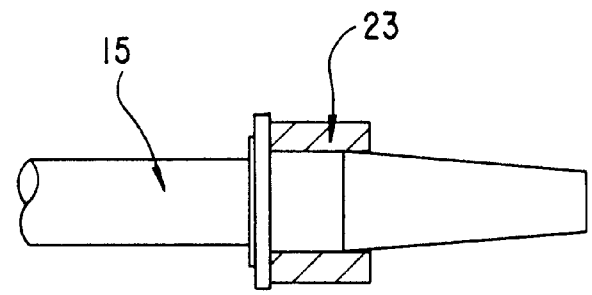
FIG. 9(b) is a partial front view showing an output shaft provided with a single annular member.
Figure 9C:
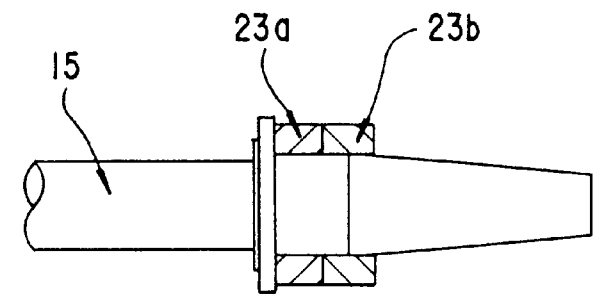
FIG. 9(c) is a partial front view showing an output shaft provided with two annular members.
Figure 9D:
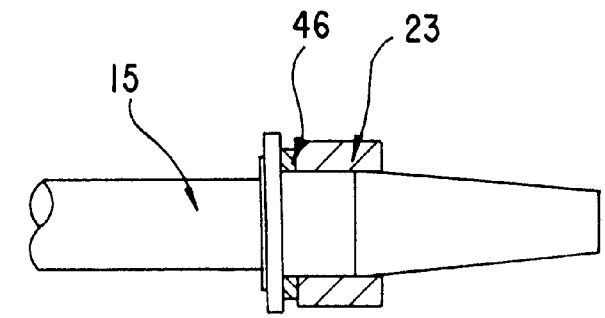
FIG. 9 (d) is a partial front view showing an output shaft having an elastic member added to an annular member.
Figure 10A:
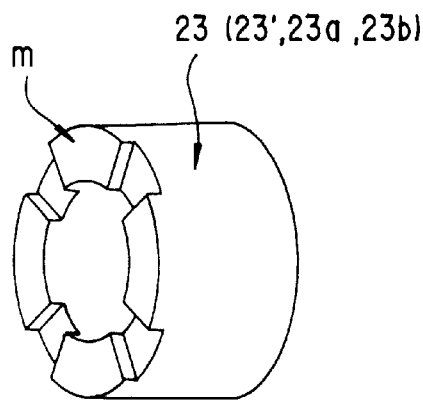
FIG. 10(a) is perspective view showing a flange or annular member having a contact surface with a shape adapted to generate a hydrodynamic pressure to support an axial force.
Figure 10C:
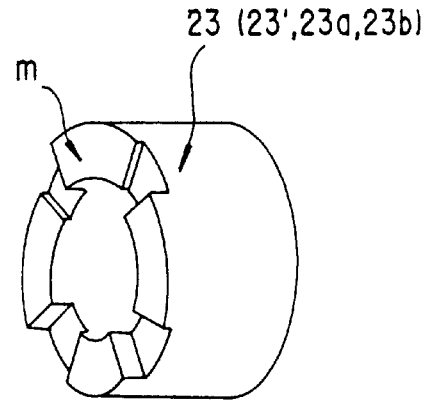
FIG. 10(c) is perspective view showing a flange or annular member having a contact surface with another shape adapted to generate a hydrodynamic pressure to support an axial force.
Figure 10B:
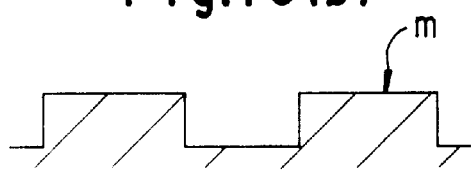
FIG. 10(b) is a sectional view showing the sectional shape of the contact surface of FIG. 10(a)
Figure 10D:
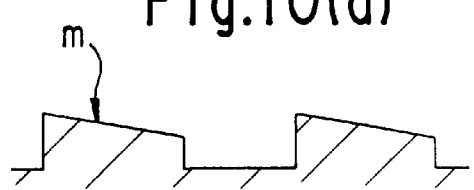
FIG. 10(d) is a sectional view showing the sectional shape of the contact surface of FIG. 10(c)
Figure 11:
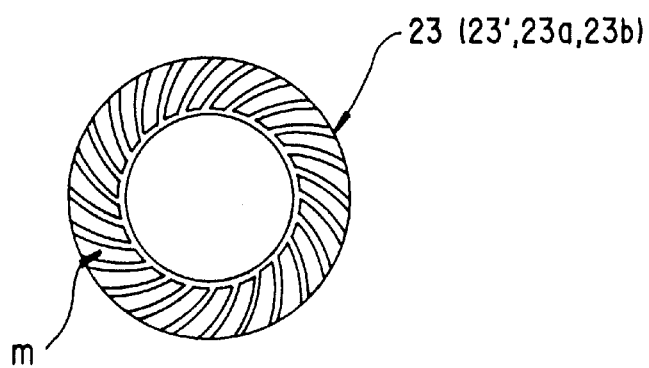
FIG. 11 is a side view showing a flange or annular member having a contact surface with another shape adapted to generate a hydrodynamic pressure to support an axial force.

Therefore, as shown in FIG. 9(a), as an axial position regulating portion, a flange 23' serving to regulate the axial position of the cone 27 is integrally formed on the output shaft 15. Further, as another axial position regulating portion, as shown in FIG. 9(b), it is possible to fit an annular member 23 on the output shaft 15 so that it is positioned between the output shaft 15 and the cone 27 (see FIGS. 1, 2 and 4). Further, as shown in FIG. 9(c), it is possible to fit a plurality of, two, in the figures, annular members 23a and 23b on the output shaft 15. Alternatively, as shown in FIG. 9(d), an elastic member 46, such as a Belleville washer or a wave washer, may be interposed between the annular member 23 and the output shaft 15.

Thereby, even if one of the cones 27 tends to move toward the output shaft, this movement is regulated by the flange 23' or annular member 23, so that all cones 27 are held in the same axial position. Further, even if one of the cones 27 tends to move toward the input shaft, the remaining cones 27 are caused to move toward the output shaft under the regulation of the inner diameter of the speed changing ring 26, so that the cones 27 are held in the same axial position by the interference with the flange 23' or annular member 23 disposed between the output shaft 15 and the cone 27.

The power loss due to sliding contact between the cone 27 and the annular member 23 can be reduced by making the annular member 23 of a material superior in slidability (such as copper allow, oil-impregnated bearing material, or resin material). Further, in the case of using the plurality of annular members 23a and 23b, the difference in slip speed between the cone 27 and the output shaft 15 can be dispersed by the slippage between the annular members 23a and 23b and hence the power loss can be reduced. Further, in the case of using the elastic member 46 interposed between the annular member 23 and the output shaft 15, it is possible to ensure that the force acting between the cone 27 and the annular member 23 is always substantially constant, so that there is no possibility of incurring a decrease in efficiency due to excessive interference between the cone 27 and the annular member 23.

In addition, as shown in FIGS. 10(a)–10(d) and 11, in the flange 23' or annular member 23, the contact surface m which abuts against the cone 27 or the output shaft 15 or in the case of the plurality of annular members 23a and 23b, the contact surfaces m of the annular members may have a shape which generates a hydrodynamic pressure to support the axial force; with this arrangement, the power loss due to sliding contact can be reduced.

Figure 12A:
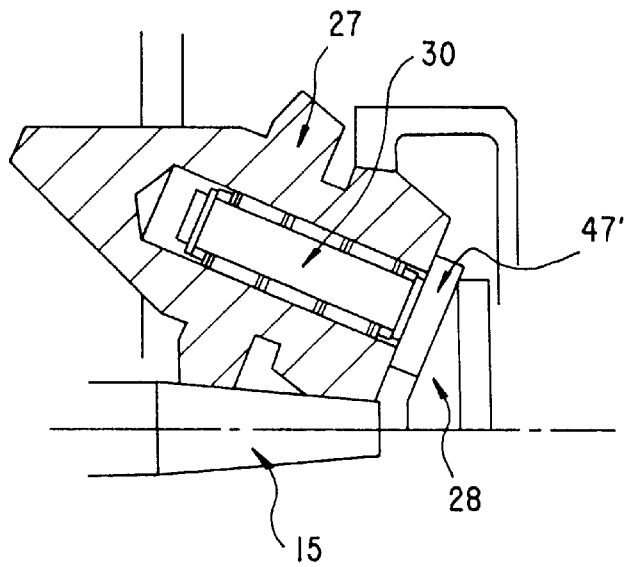
FIG. 12(a) is a partial front view showing a cone supporting shaft formed with a flange.
Figure 12B:
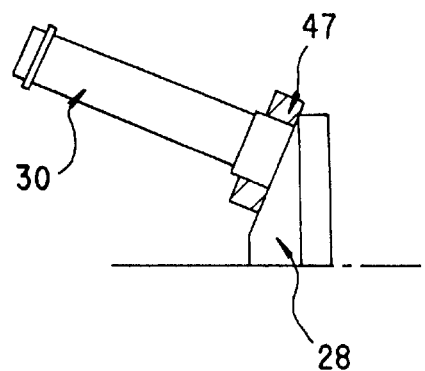
FIG. 12(b) is a partial front view showing a cone supporting shaft provided with a single annular member.
Figure 12C:
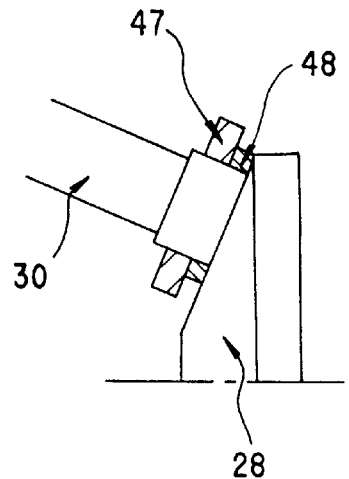
FIG. 12(c) is a partial front view showing a cone supporting shaft having an elastic member added to an annular member.

The above refers to the provision of a portion on the input shaft 15 for regulating the axial position of the cone 27; however, it is possible to provide a portion on the cone supporting shaft 30 of the cone holder 28 for regulating the axial position of the cone 27; for example, a flange 47' may be integrally formed on the base end of the cone supporting shaft 30, as shown in FIG. 12(a); an annular member 47 may be fitted on the base end of the cone supporting shaft 30 as shown in FIG. 12(b); or an elastic member 48, such as a Belleville washer, a spring washer or a wave washer, may be interposed between the annular member 47 and the cone supporting shaft 30, as shown in FIG. 12(c).

Figure 13A:
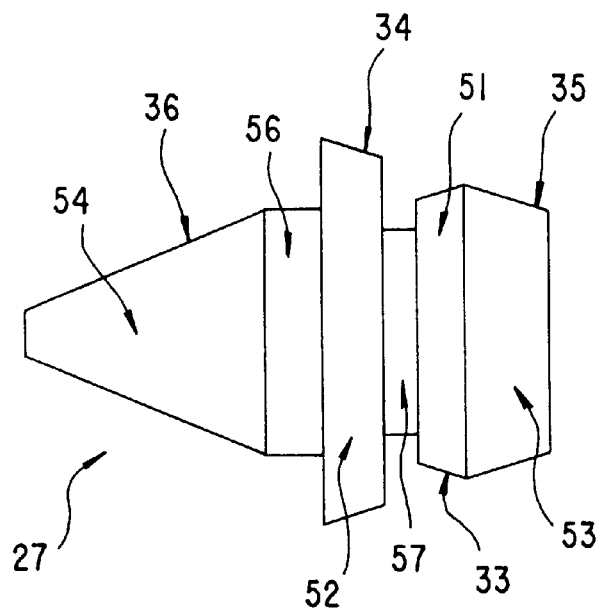
FIG. 13(a) is a front view showing a cone having four conical surf aces and two cylindrical surfaces.
Figure 13B:
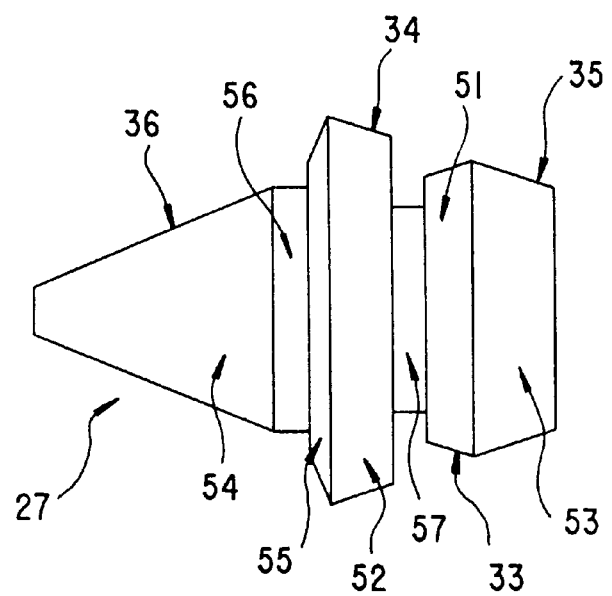
FIG. 13(b) is a front view showing a cone having five conical surfaces and two cylindrical surfaces.

In this continuously variable speed changing mechanism, each cone has not less than 4 conical surfaces and a plurality of cylindrical surfaces in order to reduce the manufacturing cost of the cones. For example, a cone 27 shown in FIG. 13(a) has four conical surfaces 51–54 and two cylindrical surfaces 56 and 57, while a cone 27 shown in FIG. 13(b) has five conical surfaces 51–55 and two cylindrical surfaces 56 and 57.

Further, each cone 27 contacts the input shaft traction portion 20, output shaft traction portion 21 and speed changing ring 26 at its four conical surfaces 51–54 including two conical surfaces 52 and 53 having the same generatrix. All of the normal forces $F_1$–$F_4$ [see FIG. 14(a)] necessary for transmitting the power applied at the contact portions 33–36 by the pressing spring 19 act in a fixed direction at all times, which direction is perpendicular to the generatrix of each conical surface. In the case where the direction of the normal forces $F_1$–$F_4$ is constant irrespective of the movement of the speed changing ring 26, if the number of normal forces is three, dynamic balance cannot be held by these normal forces alone, while if there are four normal forces, dynamic balance can be held by these normal forces alone through a suitable design of the cone shape. Retaining this balanced condition prevents excessive loads from acting on the cone supporting shafts 30 and their bearings 32 and leading to premature damage.

Figure 14A:
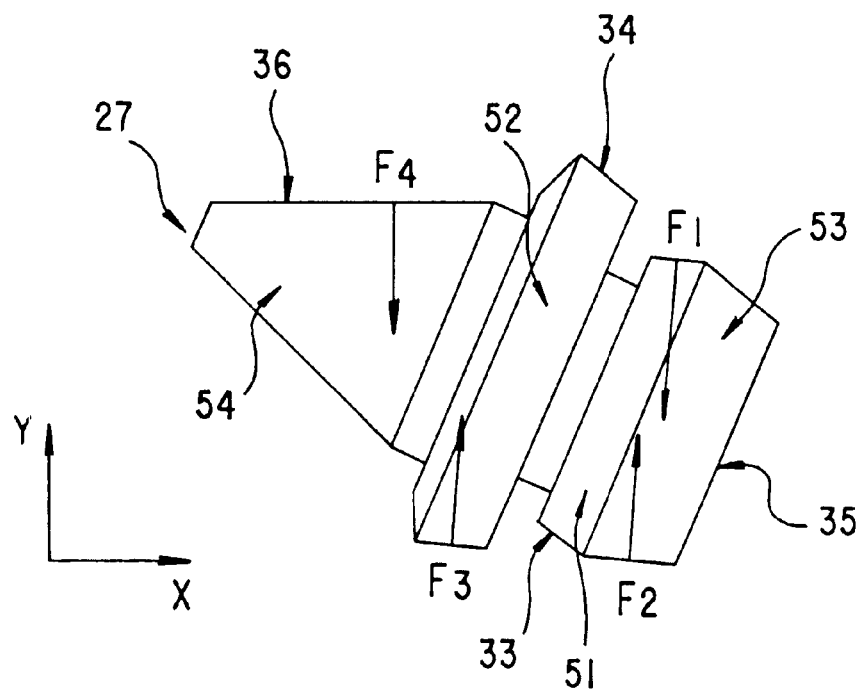
FIG. 14(a) is a front view of a cone having four contact portions and showing a normal force at each contact portion.
Figure 14B:
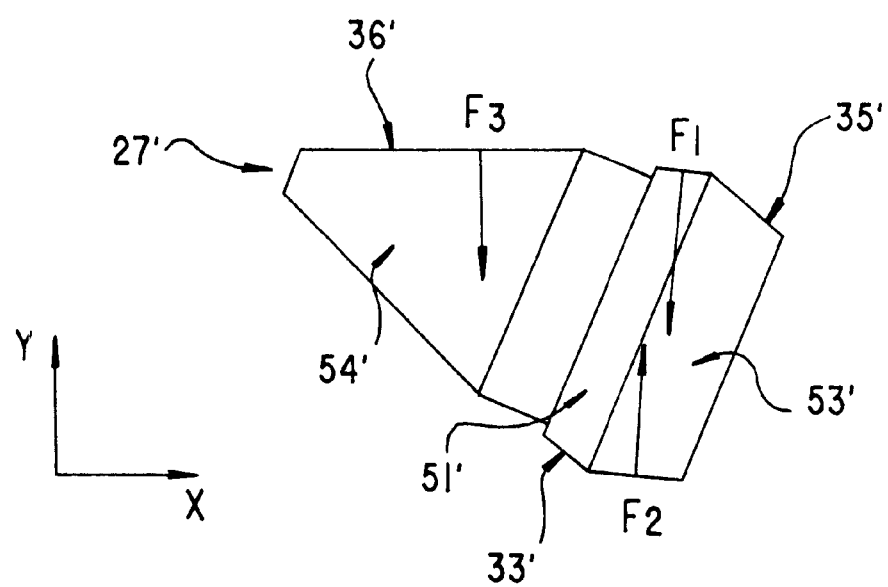
FIG. 14(b) is a front view of a cone having three contact portions and showing a normal force at each contact portion.

Now, consider a cone 27' which contacts the input and output shaft traction portions 20 and 21 and the speed changing ring 26 at its three contact portions 33', 35' and 36' [see FIG. 14(b)]. When it is desired to find the normal forces $F_1$–$F_3$ acting on the contact portions 33', 35' and 36', it is seen that whereas the normal forces Fi (i=1, 2, 3) are three unknown quantities, equations which should hold are three equations of ① balance of forces in the X-direction, ② balance of forces in the Y-direction, and ③ balance of moments, respectively. Therefore, the dynamic balance will hold for only the single values of the normal forces under certain conditions, it being difficult to make the dynamic balance hold under wide operating conditions (speed, speed ratio).

In contrast thereto, consider the cone 27 which contacts the input and output shaft traction portions 20 and 21 and speed changing ring 26 at four contact portions 33–36 in that, of the three, i.e., the input and output shaft traction portions 20 and 21 and speed changing ring 26, the output traction portion 21 contacts the cone 27 at two contact portions 34 and 35 [see FIG. 14(a)]. Whereas the normal forces Fi (i=1, 2, 3, 4) are four unknown quantities the equations which should hold are of ① balance of forces in the X-direction, ② balance of forces in the Y-direction, and ③ balance of moments, respectively. Therefore, it is possible to make the dynamic balance of the cone 27 hold by taking the normal forces $F_1$–$F_4$ alone to be the external forces acting on the cone 27 under wide operating conditions (speed, speed ratio) through a suitable design of the cone shape.

Figure 15:
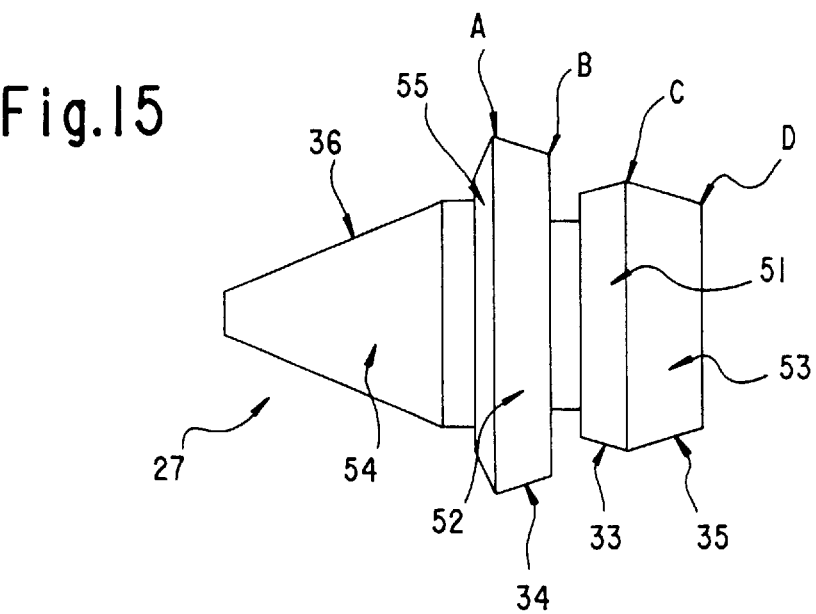
FIG. 15 is a front view showing a cone having crowing applied to both ends of two conical surfaces having the same generatrix.
Figure 16:
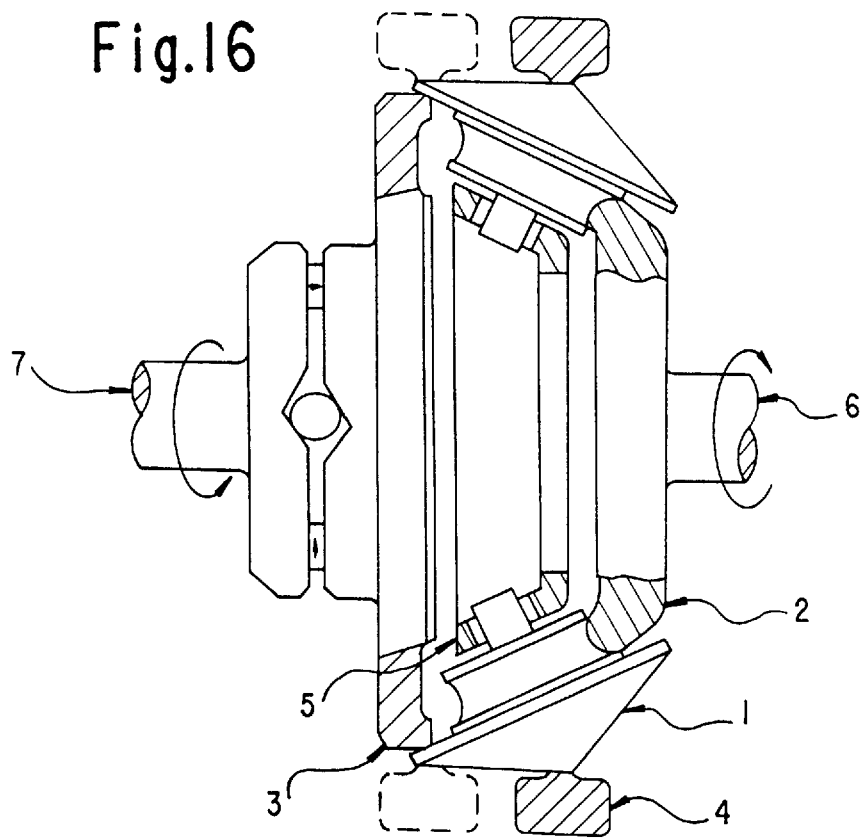
FIG. 16 is a front view showing a conventional continuously variable speed changing mechanism.

In addition, if contact between the output shaft traction portion 21 and the cone 27 is tantamount to contact between perfect conical surfaces, there is a danger of the edge load occurring, leading to premature damage to the cone 27 or output shaft 15. Therefore, it is advisable that as shown in FIG. 15, of the conical surfaces 51–55 of the cone 27, two conical surfaces 52 and 53 having the same generatrix be provided with crowning at four places A–D on the opposite ends.

What is claimed is:

1. A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement of said cones, said friction type continuously variable speed changing mechanism being characterized in that it includes a cone holder which comprises cone supporting shafts for supporting said cones, and a holder body having said cone supporting shafts integrally disposed therein equally spaced circumferentially, and said cone is shaped to have not less than four conical surfaces and is pressed against said output shaft at at least those two of said conical surfaces which have the same generatrix.

2. A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement of said cones, said friction type continuously variable speed changing mechanism being characterized in that it includes a cone holder which comprises cone supporting shafts for supporting said cones, and a holder body having said cone supporting shafts inserted and fixed therein equally spaced circumferentially and that said cone is shaped to have not less than four conical surfaces and is pressed against said output shaft at at least those two of said conical surfaces which have the same generatrix.

3. A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement of said cones, said friction type continuously variable speed changing mechanism being characterized in that a torque cam for changing the pressing force acting in the direction of the axis of the input shaft according to the input shaft torque is interposed between a traction portion internally contacted with said cone and said input shaft; and that said cone is shaped to have not less than four conical surfaces and is pressed against said output shaft at at least those two of said conical surfaces which have the same generatrix.

4. A friction type continuously variable speed changing mechanism as set forth in any one of claims 1, 2 or 3, characterized in that said holder body is supported by the input shaft.

5. A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement of said cones, said friction type continuously variable speed changing mechanism being characterized in that a position regulating portion for regulating the axial movement of each cone is disposed between said output shaft and each cone or between each cone and [the] a cone holder.

6. A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement of said cones, said friction type continuously variable speed changing mechanism being characterized in that said cone is shaped to have not less than four conical surfaces and is pressed against said output shaft at at least those two of said conical surfaces which have the same generatrix.

7. A friction type continuously variable speed changing mechanism as set forth in claim 6, characterized in that said cones being contacted with said input and output shafts and said speed changing ring at four conical surfaces of which two have the same generatrix, and all of the normal forces necessary for transmission of the power produced in the contact portions by said pressing means act always in the same direction, with a dynamically balanced state held with these normal forces alone taken to be the external forces.

8. A cone which constitutes part of a friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement of said cones, said cone being characterized in that said cone is shaped to have not less than four conical surfaces, of which at least two have the same generatrix and are pressed against the output shaft.

9. A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement of said cones, said friction type continuously variable speed changing mechanism being characterized in that it includes a cone holder which comprises cone supporting shafts for supporting said cones, and a holder body having said cone supporting shafts integrally disposed therein equally spaced circumferentially; that said holder body is supported by the input shaft; and that the input shaft has a diametrically enlarged hollow portion, and the cone holder is supported by bearings with respect to an inner surface of the hollow portion.

10. A friction type continuously variable speed changing mechanism comprising an input shaft internally contacted by a plurality of rotatably held cones, an output shaft externally contacted by said plurality of cones, pressing means for providing an elastic pressing force between said input and output shafts and said plurality of cones, and a speed changing ring slidably pressed against the cones, the arrangement being such that the speed of the output shaft is continuously changed while the power is transmitted between said input and output shafts through the turning movement of said cones, said friction type continuously variable speed changing mechanism being characterized in that it includes a cone holder which comprises cone supporting shafts for supporting said cones, and a holder body having said cone supporting shafts inserted and fixed therein equally spaced circumferentially; that said holder body is supported by the input shaft; and that said holder body is supported by the input shaft; and that the input shaft has a diametrically enlarged hollow portion, and the cone holder is supported by bearings with respect to an inner surface of the hollow portion.

* * * * *